March 24, 1931.      E. G. FELDIN      1,797,412
CHILD'S CART
Filed June 17, 1929
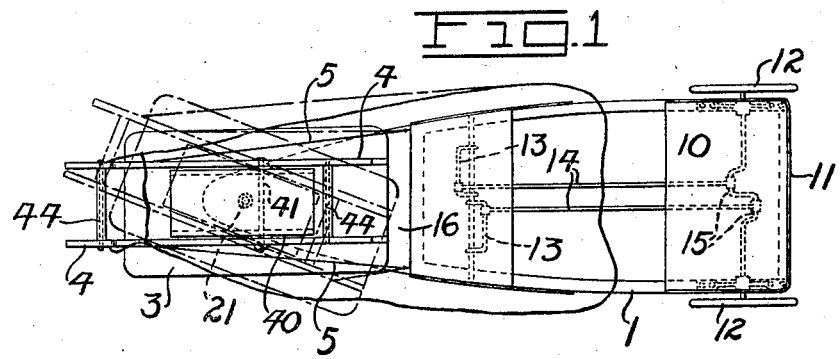
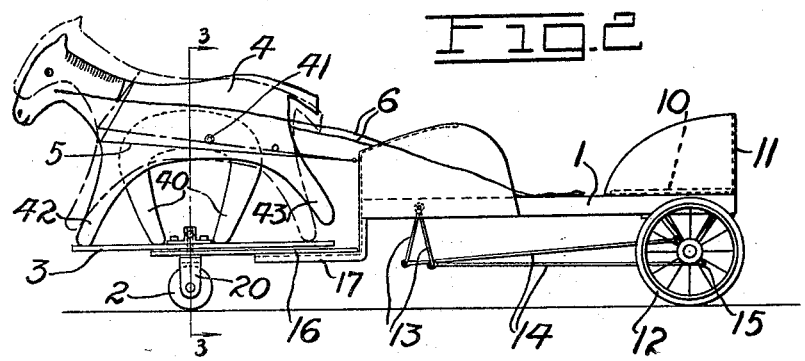
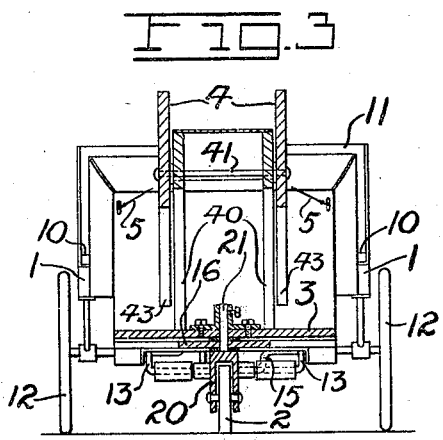
Inventor
*Emil G. Feldin*
By *Reynolds & Reynolds*
Attorneys Patented Mar. 24, 1931

1,797,412

UNITED STATES PATENT OFFICE

EMIL G. FELDIN, OF EVERETT, WASHINGTON

CHILD'S CART

Application filed June 17, 1929. Serial No. 371,439.

My invention relates to a child's cart or vehicle, and is intended for smaller children, the purpose being to provide at the front of the cart a simulation of an animal or a team, horses, for instance, which are so mounted that they may move or oscillate to one side or the other, and in so doing control the direction of the vehicle, and which are so mounted as to pivot upon a horizontal axis, whereby the action of galloping may be simulated, these two movements being both controllable by the occupant of the cart through reins or a like device.

The principal object of my invention is, as has been indicated, to provide a device of the character described, which will simulate the galloping and change of direction of the animal, and which is controlled by the child occupying the cart.

A further object is the provision of a device of this character which will be simple in its construction, and therefore inexpensive and not liable to get out of order.

A further object is the provision in such a device of means which will normally hold the animal form in its straight-ahead position, and preferably, also, in such a position that a pull on the reins will cause it to rear on its hind legs to rock on the horizontal pivot, and which upon slackening of the reins will cause the animal form to assume again its normal position.

Other objects, and particularly such as pertain more specifically to the structural details of my invention, may be ascertained from a study of the drawings, specification, and claims, the whole of which constitutes the present application.

My invention comprises the novel parts, the novel combination and arrangement thereof, all as shown in the accompanying drawings, described in the specification, and defined by the claims which terminate the present specification.

In the accompanying drawings I have shown my invention in a form which is now preferred by me.

Figure 1 is a plan view of my cart.
Figure 2 is a side elevation of the same.
Figure 3 is a cross-section on the line 3—3 of Fig. 2.

It is immaterial whether the cart be of the type which is pushed or pulled, or which is self-propelled. The latter type is shown. The cart may consist of the frame 1, the seat 10, provided with a back 11, and the wheels 12 at the rear end, which support this end of the cart, and a support for the forward end which will be described later. In addition to these essential parts of the cart, I have shown herein the links 13 which form foot rests and cranks, and the connecting links 14 which extend to cranks 15 formed in the rear axle which carries the wheels 12, as is common in the art. By these or like means the vehicle can be propelled by the child occupying the cart.

In advance of the cart a wheel 2 is carried by a bifurcated member 20, terminating at its upper end in a vertical shaft 21 (see Figure 3). This is journaled in some suitable manner in or to the cart, and this may be accomplished by projecting forward a board 16 held in forwardly projecting brackets 17 carried by the cart. Thus, the direction in which the wheel 2 is turned controls the direction of the cart.

Secured upon the upper end of the shaft 21, and oscillatable therewith, is a table 3. The manner of securement may be any that is found suitable, and an example of such a support is illustrated in Figure 3. The table 3 may oscillate relative to the cart 1 and the board 16, which underlies it, and the table 3 turns with the wheel 2. Upon this table is supported an animal form, and preferably this is made in two parts, a fixed or central part 40 representing a fore leg and a hind leg of the animal, and a rocking part 4 representing the body, head, tail, and the other two legs, fore leg and hind leg, respectively, of the animal form. This animal form may, of course, be doubled to indicate a team, and has been so illustrated, in which case the two forms 4 are tied together by cross-bars 44 for joint movement.

The form 4 is supported by a pivot axis 41, which extends horizontally, and the form 4 is thus supported from the table 3, or in effect from the cart, so that it may rock upon the horizontal axis. Preferably, the axis 41 is so disposed, relative to the center of gravity of the form 4, that the fore legs 42 of the form 4 tend to drop, and the hind legs 43 tend to rise. The table 3 may be interposed to limit the movement of these legs, if desired. Another way that may be employed, alone or in conjunction with the means just described, to maintain the fore legs 42 normally dropped, consists of elastic tugs 5, which are secured to the fore part of the animal form 4, and extend thence, preferably below the pivot 41, to a connection to the cart 1. Two such tugs are employed, these being connected to the animal form and to opposite sides of the cart, and since these are elastic they are normally held slightly in tension, so that they tend to maintain the animal form with the fore legs 42 dropped, and if the tension is in equilibrium they will also tend to keep the animal form in straight-ahead position with respect to the cart, that is, not turned from a straight-ahead position with respect to the axis 21.

To control movement of the form 4 reins 6 are attached to the form, preferably at some such location as would correspond to the mouth of the animal, that is, in its fore part, and above the pivot 41. Thence the reins 6 extend back to a point where they are within convenient reach of the cart's occupant. Naturally, the reins would be doubled, that is, there would be one rein running to one side of the animal form 4 and one to the other side.

Now, when the vehicle is in motion, or for that matter when it is at rest, a pull on both reins will cause the animal form 4 to rock on the pivot 41, in opposition to the force of gravity, and to the force of the elastic tugs 5, either or both. Preferably, however, the rocking movement is so limited, as by contact of the rear legs 43 with the table 3, that the tugs 5 do not rise about the level of the pivot 41. Hence, when the reins are slacked off the action of gravity and of the tugs 5 causes the animal form to drop, so that the fore legs 42 rest upon the table 3. The normal position is shown in full lines in Figure 2, and the position assumed when the reins are pulled is shown in dot and dash lines in that figure.

When it is desired to alter the direction of the vehicle, one or the other of the reins is pulled upon, for instance, the right rein, which causes the entire animal form, the table 3 which supports it, and the wheels 2 to turn to the right, as indicated by the dot and dash lines in Figure 1. The same pull on the reins may also cause the animal form to rear, as before, but this only serves to simulate more realistically the motions of the animal in turning, and in galloping. Release of the one rein, in such a case, will release the animal form and its table to the action of the elastic tugs 5, and these will cause the animal form and its table 3, and of course, the wheel 2, to assume the normal straight-ahead position, or this may be aided, if there should be any tendency for the pivot of the shaft 21 to stick, by a pull on the left rein, assuming the animal to have been pulled first to the right.

By the mechanism described the smallest child can himself control the galloping motion and the direction of the cart, and can quickly learn to pedal himself forward, and he is thus furnished a highly amusing and interesting device, in which he can get needed exercise, and from which he will achieve a great deal of enjoyment. The same is true whether the propelling mechanism is used, or not. If the vehicle is merely pushed or pulled the child can through the same means, the reins, control the direction of the cart and the galloping movement of the animal form.

What I claim as my invention is:

1. In combination with a child's cart, a table pivotally supported on a vertical axis in advance of the cart, an animal form supported upon said table, elastic means operatively connecting the animal form with the cart, whereby the animal form and table are normally held in straight-ahead position, guiding means under control of the cart's occupant and operatively connected to the animal form to draw the form and table to one side or the other in opposition to the respective tugs, and a ground wheel operatively connected to the table to be turned as the table is turned, thereby to direct the cart in a corresponding direction.

2. In combination with a child's cart having a supporting wheel journaled in the front thereof on a vertical axis, a table secured upon said shaft and oscillatable therewith, an animal form supported upon the table and oscillatable therewith, reins extending from said animal form to the cart's occupant, whereby the said form, table, and wheel can be turned in one direction or the other, and elastic means operatively connected to the table and cart to maintain the former normally in straight-ahead positon, but yieldable under the influence of a force applied to the reins.

3. The combination of claim 2, the elastic means comprising elastic tugs extending from the animal form to each side of the cart, and normally in equal tension to hold the form in straight-ahead position.

4. In combination with a child's cart, an animal form supported in advance thereof upon a horizontal pivot axis, said form including fore and hind legs, means disposed and arranged to normally cause the fore legs to drop, means with which the fore and hind legs may contact, alternately, to limit the rocking of the body, and reins extending from the animal form to the cart's occupant, whereby the animal may be caused to rock upon said pivot axis.

5. In combination with a child's cart, an animal form supported in advance thereof upon a horizontal pivot axis, said form including fore and hind legs, and said axis being so disposed, relative to the center of gravity, as to normally cause the fore legs to drop, by gravity, means with which the fore and hind legs may contact, alternately, to limit the rocking of the body, and reins extending from the animal form, ahead of and above said pivot, to the cart's occupant, whereby the animal may be caused to rock upon said pivot axis.

6. In combination with a child's cart, an animal form supported in advance thereof upon a horizontal pivot axis, said form including fore and hind legs, elastic tugs connected to the fore part of the animal form, and extending from thence to the cart, below the pivot axis, whereby the fore legs normally drop, and reins extending from the fore part of the animal form, above the pivot, to the cart's occupant, whereby the animal may be caused to rock upon said pivot axis.

7. In combination with a child's cart having a supporting wheel journaled in the front thereof on a vertical axis, a table secured upon said shaft and oscillatable therewith, an animal form including fore and hind legs pivoted upon said table upon a horizontal axis, said form being disposed and arranged to cause its fore legs to drop, normally, and reins extending from the fore part of the animal form, above the pivot, to the cart's occupant, whereby the form may be rocked upon its horizontal pivot and the said form, table, and wheel may be turned to one side or the other under control of said reins.

8. The combination of claim 7, and elastic tugs secured to the fore part of the form, and extending from thence rearwardly, below the horizontal pivot axis, to laterally spaced connections with the cart, whereby the animal form is normally maintained in straight-ahead position and with the fore legs depressed.

Signed at Everett, Washington, this 8th day of June, 1929.

EMIL G. FELDIN.